Dec. 19, 1967 G. A. HENDERSON 3,358,720
CIRCULAR SAW WITH SCRAP DISINTEGRATOR
Filed Feb. 28, 1966
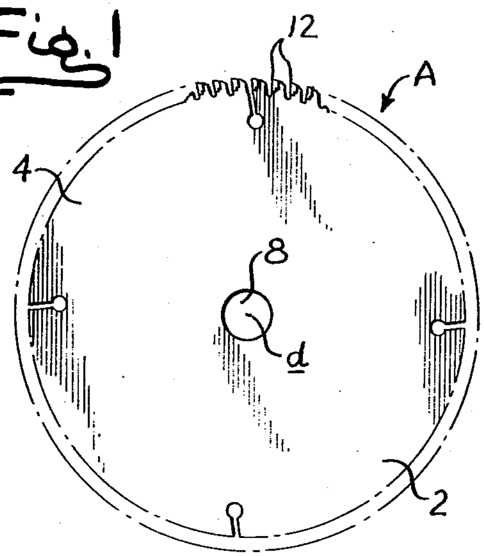
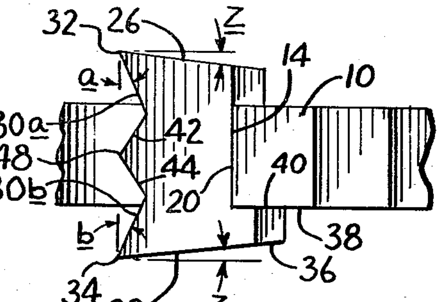
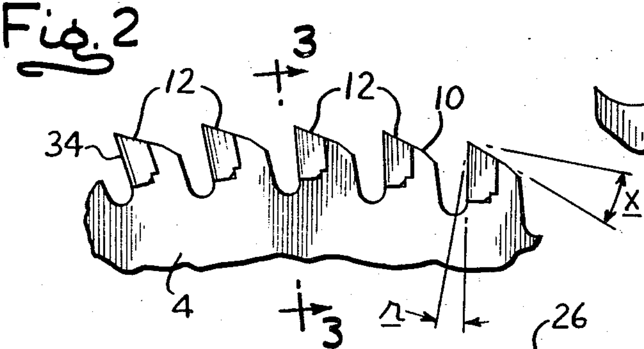
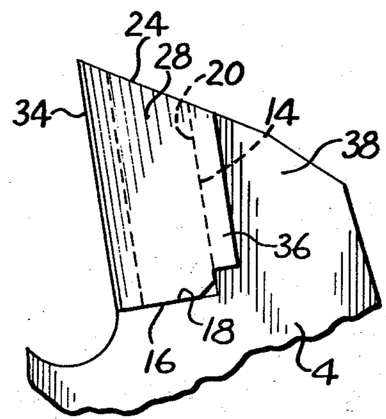
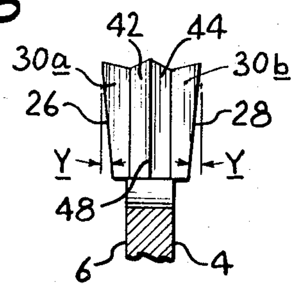
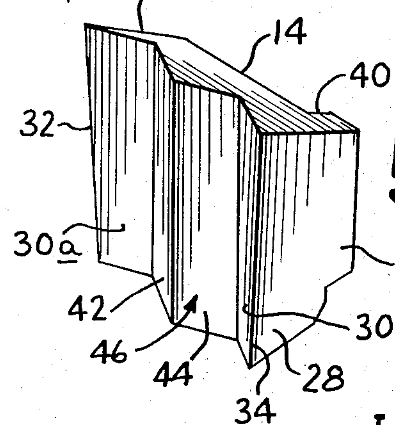
INVENTOR
GEORGE A. HENDERSON
by: Spector + Alster
ATTYS United States Patent Office 3,358,720 Patented Dec. 19, 1967

3,358,720

CIRCULAR SAW WITH SCRAP DISINTEGRATOR

George A. Henderson, 2923 N. Linder Ave., Chicago, Ill. 60641

Filed Feb. 28, 1966, Ser. No. 530,702
8 Claims. (Cl. 143—133)

This invention relates to improvements in circular saws, particularly those of the carbide tipped type.

It is an object of the present invention to provide a carbide tipped saw in which the tip is modified to provide a scrap disintegrator that functions to keep the tip clean of material.

It is a more specific object of the present invention to provide a circular saw having carbide tips with dual shear face angles at each side thereof, which results in a recessed front face on the tip, and wherein the tip includes a member for breaking up stock material cut by the saw and reducing the accumulation of material in the recess. A carbide tipped saw of the foregoing type is suitable for cutting gypsum board, wood, tile plastics, and the like. In accordance with the preferred embodiment of the invention, the front face of the tip is recessed in a manner that provides an effective V-face but departs from the V-face by a chip-breaking wedge cutter portion that is located midway between the side cutting edges. The wedge extends from the radially inner end to the radially outer end of the tip so that the wedge is of about the same length as that of the recessed face of the tip.

It is a further object of the present invention to provide a circular saw in which the dual shear face angles result in a clean cut at each side of the kerf of the saw and also tend to equalize the lateral forces on the saw during cutting. As a result, the shear forces on the bonded interface between the tooth and saw body are equalized which tends to reduce the possibility of the tooth being sheared off the saw.

The attainment of the above and further objects of the present invention will be apparent from the following specification taken in conjunction with the accompanying drawing forming a part thereof.

In the drawing:

FIG. 1 is a side elevational view of a circular saw constructed in accordance with and embodying the present invention;

FIG. 2 is a fragmentary side elevational view, on an enlarged scale, of a portion of the saw of FIG. 1 and showing several teeth thereon;

FIG. 3 is a fragmentary sectional view taken along line 3—3 of FIG. 2;

FIG. 4 is a fragmentary top plan view of a portion of the structure shown in FIG. 2;

FIG. 5 is a side elevational view of the structure shown in FIG. 4; and

FIG. 6 is a perspective view of a carbide tip that forms part of the present invention.

Referring now in more detail to the drawing in which like reference characters indicate like parts, A designates a circular saw having a tempered steel, balanced, flat disc-like saw body 2 with opposite parallel sides 4, 6 which are perpendicular to the axis of rotation *d* of the saw body 2. Formed in the saw body 2 and surrounding the axis *d* is a hole 8 by which the saw may be mounted on the saw arbor of the machine that drives the saw.

Integrally formed on the periphery of the saw body 2 and extending completely therearound are circumferentially spaced tooth-backing elements 10, and mounted on the tooth-backing elements 10 are tips or saw teeth 12. The tips or saw teeth 12 are preferably identical and may be formed of a suitable tungsten carbide steel. Each tooth-backing element 10 is formed with a generally L-shaped seat having adjacent circumferential and outwardly extending shoulders 14, 16 which are shown as being surfaces that are perpendicular to the sides 4, 6. These surfaces 14, 16 are sized for flush-fitting reception of similarly shaped bottom and rear surfaces 18, 20 which are on the tips 12. The tips 12 may be secured to the tooth-backing elements 10 in any suitable manner, as for instance by brazing.

Formed on the tips 12 are radially outer end surfaces 24 which are inclined to provide a top clearance angle X, and this clearance angle X may be of the order of 20 degrees. The teeth also have lateral faces 26, 28 which, as seen by the drawing, are entirely laterally outwardly, respectively, of the adjacent sides 4, 6 of the saw body 2. The lateral faces 26, 28 may be set at small vertical clearance angles Y, Y, which may be of the order of 3 to 5 degrees. Similarly, the lateral faces 26, 28 may diverge to provide small side clearance angles Z, which likewise may be of the order of 3 to 5 degrees.

The front face of each tip 12 is recessed and is contoured to provide cutting edges 32, 34 that are laterally of the disc sides 4, 6, and the cutting edges of all of the tips form surfaces of revolution that define the kerf of the saw. The cutting edges are disposed to form a rake angle *r*. Furthermore, the recessed front face of each tip 12 forms dual, equal, acute shear face angles *a*, *b*, at each side of the tip. Preferably, the shear angles *a*, *b* are formed by generally planar front face sections 30*a*, 30*b*. The planes in which the surfaces 30*a*, 30*b* are located intersect at a line that is in the mid-plane of the tip and the saw body 2. For purposes of the present invention, acute shear face angles *a*, *b* of about 30 degrees with respect to planes passing through the plane of the cutting edges 32, 34 have been found satisfactory.

By reason of the fact that each tip 12 has a cutting edge 32, 34 at each side thereof, the cutting action of the tip tends to set up equal and opposite lateral reaction forces on the saw body 2, and this construction assists in maintaining the saw planar and enables a greater accuracy of cut along a straight line. Furthermore, each cutting edge 32, 34 makes a shear cut due to the presence of the dual shear angles *a*, *b*, with the result that the cut edges of both of the two pieces that are formed by the cutting operation will be smooth and have a finished appearance. Furthermore, the shear forces on the tips and parallel to the axis of rotation *d* are imposed in opposite directions along the bonded interfaces 16, 18 and 14, 20. These forces tend to be equalized due to the equal and opposite shear face angles on the tips.

If desired, the tip 12 may have an integral rearwardly extending flange 36 which lies against one side face 38 of the tooth-backing element 10. The adjacent surface 40 of the flange 36 and the side face 38 may be brazed together as are the adjacent surfaces of the tip and L-shaped seat on the backing element 10. The flange 36 facilitates approximate centering of the tip on the backing element during assembly of the tip therewith. For this purpose the flange 36 may have such width that when it is placed against the side face 38 with the tip seated on the backing element, the tip is centered with respect to the saw body 2. Substantially the entire surface 40 of the flange 36 may be flush with the side face 38. However, to compensate for possible irregularities such as small lateral projections at the junction of the L-shaped seat and side face 38, the surface 40 may be at a small angle to the side face 38, for example about 3 to 5 degrees, or in other words, about parallel to the tip side face 28. In that case, the rear edge portion of the flange 36 will abut the side face 38 and the brazing solder will fill the small void between the remainder of two surfaces 38, 40.

While the presence of the flange 36 may impart strength to the bonded interfaces of the tip 45 and saw body because of the increased area of bond between the two, the flange 36 need not be relied upon to resist the lateral shear forces acting at the bonded L-shaped surfaces of the tip and backing element because of the equal and opposite shear face angles *a* and *b* on the tip, which, as previously pointed out, tend to equalize those shear forces.

Also on the recessed front face of the tip 12 are adjacent V-forming surfaces 42, 44 which extend respectively from the ends of the surfaces 30*a*, 30*b* forwardly and define the sides of a wedge 46 having a cutting edge 48. The cutting edge 48 is substantially in the mid-plane of the tip 12. Preferably the wedge 46 has a width at its base (that is, the distance between the intersection of surfaces 30*a*, 42 and 30*b*, 44) which is slightly less than one half the width of the tip between the cutting edges 32, 34. Thus the wedge 46 is entirely intermediate the adjacent side faces of the saw body 2 and backing element 10. Moreover, surfaces 42, 44 intersect at the cutting edge 48 to form an obtuse angle.

The wedge 46 occupies a part of the recessed front face of the tip and extends from the radially inner end or shoulder 16 of the tip 12 to the radially outer surface 24. During operation of the saw, the wedge 46 constitutes a chip breaker or scrap disintegrator that breaks up stock material cut by the saw. This reduces the accumulation of material on the recessed front face of the tip that otherwise might result in a carbide tip with a V-shaped front face but absent the chip breaker. The saw of the present invention is thus rendered more efficient in its operation.

When the saw tips 12 are sharpened as by grinding the side faces 26, 28, the surfaces 30*a*, 30*b* are shortened while the surfaces 42, 44 remain the same. As a result, the cutting edge 48 of the wedge 46 will tend to "lead" the cutting edges 32, 34 during the sawing operation. This does not appear to affect, at least to any significant degree, the cutting efficiency of the saw. In fact, the adjacent V's that form the recess of the front face of the tip are then each shorter on one leg resulting in less of a recess on the front face and hence less of a likelihood of there being accumulation of material on the front face.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. A circular saw comprising a saw body having opposite sides, circumferentially spaced tooth backing elements on the periphery of the saw body, each backing element having a seat, a carbide saw tooth secured to each seat, each tooth having opposite side faces lying laterally outwardly respectively of the adjacent peripheral parts of said opposite sides, each tooth having surfaces with portions thereof that intersect respectively the side faces of the tooth to form cutting edges lying outwardly of said peripheral parts and which cutting edges define opposed surfaces of revolution forming the kerf of the saw, said surfaces providing a recessed tooth face and equal and opposite acute shear face angles at each side of the tooth, and wedge shaped means constituting an integral part of said tooth and located intermediate said side faces of the tooth for breaking up stock material cut by the saw and reducing accumulation of stock material on the recessed face.

2. A circular saw according to claim 1 in which said wedge means has a cutting edge located between the cutting edges at the side faces of the tooth, said wedge means being formed by intersecting parts of said surfaces.

3. A circular saw according to claim 1 in which said recess is in the front face of the tooth and is in the shape substantially of adjacent V's with adjacent legs of the V's intersecting to form a cutting edge on said wedge means.

4. A circular saw according to claim 3 in which said adjacent legs form an obtuse angle.

5. A circular saw according to claim 1 in which the cutting edges lie entirely laterally outwardly of the adjacent peripheral parts of the saw and said wedge means has a cutting edge substantially mid-way between said side faces of the saw body.

6. A circular saw comprising a tempered flat disc-like saw body having opposite sides perpendicular to the axis of rotation of the body, circumferentially spaced tooth backing elements on the periphery of the saw body and projecting radially outwardly therefrom, each backing element having a generally L-shaped seat formed by circumferential and outwardly presented tooth-supporting surfaces, a carbide saw tooth having surfaces that define generally an L-shaped and with said tooth surfaces abutting said surfaces on a backing element and with said abutting surfaces of the tooth and backing element being substantially perpendicular to said opposite sides and being secured together by a bonding film interposed therebetween, each saw tooth having the entire opposite side faces lying laterally outwardly respectively of said opposite sides of said saw body, each saw tooth also having its front face presented toward the adjacent forward backing element, the front face having surfaces that intersect respectively the side faces of the tooth to form cutting edges lying entirely axially outwardly of said opposite sides of the saw body and which cutting edges define opposed surfaces of revolution forming the kerf of the saw, said surfaces extending from their associated cutting edges toward each other and toward the circumferential supporting surface upon which the tooth is mounted to form equal and opposite acute shear face angles at each side of the tooth, and means including an intermediate edge on said tooth located axially between said cutting edges and between the radially outer and inner ends of the tooth for breaking up stock material cut by the saw and reducing the accumulation of stock material on said front face.

7. A circular saw according to claim 6 in which said means includes additional surfaces on said front face that extend respectively from the first mentioned surfaces toward each other and away from the circumferential supporting surface upon which the tooth is mounted and intersecting in said intermediate edge.

8. A circular saw according to claim 7 in which said additional surfaces intersect to form an obtuse angle.

References Cited

UNITED STATES PATENTS

| | | | |
|---|---|---|---|
| 1,687,448 | 10/1928 | Hildreth | 143—141 |
| 3,261,384 | 7/1966 | Henderson | 143—133 |

DONALD R. SCHRAN, *Primary Examiner*.